(12) United States Patent
Katz et al.

(10) Patent No.: US 12,294,806 B2
(45) Date of Patent: *May 6, 2025

(54) VARIED DEPTH DETERMINATION USING STEREO VISION AND PHASE DETECTION AUTO FOCUS (PDAF)

(71) Applicant: Snap Inc., Santa Monica, CA (US)

(72) Inventors: Sagi Katz, Yokneam Ilit (IL); Daniel Wagner, Vienna (AT); Weston Welge, Boulder, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,150

(22) Filed: Mar. 15, 2024

(65) Prior Publication Data

US 2024/0223715 A1  Jul. 4, 2024

Related U.S. Application Data

(63) Continuation of application No. 18/129,009, filed on Mar. 30, 2023, now Pat. No. 11,974,060, which is a (Continued)

(51) Int. Cl.
*H04N 5/222* (2006.01)
*H04N 23/45* (2023.01)
*H04N 23/67* (2023.01)

(52) U.S. Cl.
CPC ........... *H04N 5/2226* (2013.01); *H04N 23/45* (2023.01); *H04N 23/672* (2023.01)

(58) Field of Classification Search
CPC .... H04N 5/2226; H04N 23/45; H04N 23/672; G06T 2207/20008; G06T 7/593; G06T 7/571
See application file for complete search history.

(56) References Cited

U.S. PATENT DOCUMENTS 10,410,368 B1 * 9/2019 Galor Gluskin ..... H04N 25/704
11,227,149 B2    1/2022 Han et al.
(Continued)

FOREIGN PATENT DOCUMENTS

CN        117321632 A    12/2023
WO   WO-2020068362 A1    4/2020
(Continued)

OTHER PUBLICATIONS

"U.S. Appl. No. 17/746,292, Corrected Notice of Allowability mailed Apr. 14, 2023", 4 pgs.
(Continued)

*Primary Examiner* — Shahbaz Nazrul
(74) *Attorney, Agent, or Firm* — Schwegman Lundberg & Woessner, P.A.

(57) ABSTRACT

Disclosed are systems, methods, and non-transitory computer-readable media for varied depth determination using stereo vision and phase detection auto focus (PDAF). Computer stereo vision (stereo vision) is used to extract three-dimensional information from digital images. To utilize stereo vison, two optical sensors are displaced horizontally from one another and used to capture images depicting two differing views of a real-world environment from two different vantage points. The relative depth of the objects captured in the images is determined using triangulation by comparing the relative positions of the objects in the two images. For example, the relative positions of matching objects (e.g., features) identified in the captured images are used along with the known orientation of the optical sensors (e.g., distance between the optical sensors, vantage points the optical sensors) to estimate the depth of the objects.

20 Claims, 5 Drawing Sheets

Related U.S. Application Data continuation of application No. 17/746,292, filed on May 17, 2022, now Pat. No. 11,722,630.

(60) Provisional application No. 63/190,126, filed on May 18, 2021.

(56) References Cited

U.S. PATENT DOCUMENTS

| | | | |
|---|---|---|---|
| 11,722,630 B2 | 8/2023 | Katz et al. | |
| 2007/0272599 A1* | 11/2007 | Miyashita | A61B 5/1101 209/527 |
| 2018/0054562 A1 | 2/2018 | Li et al. | |
| 2018/0176452 A1 | 6/2018 | Nikkanen et al. | |
| 2019/0289218 A1 | 9/2019 | Liu | |
| 2020/0342652 A1 | 10/2020 | Rowell et al. | |
| 2021/0067705 A1 | 3/2021 | Galor Gluskin et al. | |
| 2021/0133475 A1 | 5/2021 | Sudar et al. | |
| 2022/0294990 A1 | 9/2022 | Masuda et al. | |
| 2022/0377209 A1 | 11/2022 | Katz et al. | |
| 2023/0239423 A1 | 7/2023 | Katz et al. | |

FOREIGN PATENT DOCUMENTS

| | | |
|---|---|---|
| WO | WO-2021076757 A1 | 4/2021 |
| WO | WO-2022245855 A1 | 11/2022 |

OTHER PUBLICATIONS

"U.S. Appl. No. 17/746,292, Non Final Office Action mailed Feb. 2, 2023", 15 pgs.

"U.S. Appl. No. 17/746,292, Notice of Allowance mailed Mar. 17, 2023", 7 pgs.

"U.S. Appl. No. 17/746,292, Response filed Feb. 16, 2023 to Non Final Office Action mailed Feb. 2, 2023", 12 pgs.

"U.S. Appl. No. 18/129,009, Corrected Notice of Allowability mailed Jan. 11, 2024", 5 pgs.

"U.S. Appl. No. 18/129,009, Non Final Office Action mailed Oct. 6, 2023", 17 pgs.

"U.S. Appl. No. 18/129,009, Notice of Allowance mailed Dec. 29, 2023", 7 pgs.

"U.S. Appl. No. 18/129,009, Response filed Dec. 2, 2023 to Non Final Office Action mailed Oct. 6, 2023", 9 pgs.

"International Application Serial No. PCT/US2022/029673, International Preliminary Report on Patentability mailed Nov. 30, 2023", 7 pgs.

"International Application Serial No. PCT/US2022/029673, International Search Report mailed Oct. 21, 2022", 5 pgs.

"International Application Serial No. PCT/US2022/029673, Written Opinion mailed Oct. 21, 2022", 5 pgs.

U.S. Appl. No. 17/736,603, filed May 4, 2022, Varied Depth Determination Using Stereo Vision and Phase Detection Auto Focus (PDAF).

U.S. Appl. No. 17/746,292 U.S. Pat. No. 11,722,630, filed May 17, 2022, Varied Depth Determination Using Stereo Vision and Phase Detection Auto Focus (PDAF).

U.S. Appl. No. 18/129,009, filed Mar. 30, 2023, Varied Depth Determination Using Stereo Vision and Phase Detection Auto Focus (PDAF).

* cited by examiner

VARIED DEPTH DETERMINATION USING STEREO VISION AND PHASE DETECTION AUTO FOCUS (PDAF)

RELATED APPLICATIONS

This application is a continuation of U.S. application Ser. No. 18/129,009, filed Mar. 30, 2023, which application is a continuation of U.S. application Ser. No. 17/746,292, filed May 17, 2022, which application claims benefit of priority from U.S. Provisional Patent Application Ser. No. 63/190,126, filed on May 18, 2021.

TECHNICAL FIELD

An embodiment of the present subject matter relates generally to determining depth data and, more specifically, to varied depth determination using stereo vision and PDAF.

BACKGROUND

Computer stereo vision allows for the extraction of three-dimensional information from digital images. Two cameras displaced horizontally from one another are used to capture images depicting two differing views of a scene from two different vantage points. The relative depth of objects captured in the images is determined by comparing the relative positions of the objects in the two images. For example, the known distance and vantage points of the of the cameras can be used along with the relative positions of the objects to estimate the depth of the objects.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appear to be attached or interact with a real-world physical object.

Disclosed are systems, methods, and non-transitory computer-readable media for varied depth determination using stereo vision and PDAF. Computer stereo vision (stereo vision) is used to extract three-dimensional information from digital images. To utilize stereo vison, two optical sensors are displaced horizontally from one another and used to capture images depicting two differing views of a real-world environment from two different vantage points. The relative depth of the objects captured in the images is determined using triangulation by comparing the relative positions of the objects in the two images. For example, the relative positions of matching objects (e.g., features) identified in the captured images are used along with the known orientation of the optical sensors (e.g., distance between the optical sensors, vantage points the optical sensors) to estimate the depth of the objects.

Computer stereo vision, however, has technical limitations under certain circumstances, such as when objects are in close proximity to the optical sensors. In this type of situation, the search range for identifying the objects in each image is expanded, resulting in an increase in computing resource usage and latency associated with determining the depth of the objects. In some cases, a feature of an object that is in close proximity may simply not be visible by both cameras, a situation knows as occlusion. Computer stereo vision also does not perform well when detecting certain shapes of objects due to the varying vantage points of the cameras. For example, the edge of a cylinder may appear at different position by each camera due to the varying vantage points of each. Accordingly, improvements are needed.

To alleviate the shortcomings of stereo vision, a depth determination system may use a combination of both stereo vision and PDAF to determine depth data. PDAF provides better performance than stereo vision under certain circumstance, such as when objects are in close proximity. The depth determination system therefore may use stereo vision generally to determine depth data and switch to using PDAF to determine depth data in the situations in which PDAF provides better performance. For example, PDAF may be used when objects are in close proximity to the optical sensors and/or the shape of the object may cause the features to be detected at different position using stereo vision.

The depth determination system determines whether to use stereo vision or PDAF based on a depth value determined using PDAF (PDAF depth value) and a threshold value. The PDAF depth value indicates the depth of an object detected by an optical sensor. The depth determination system compares the PDAF depth value to the threshold value to determine whether to use the PDAF depth value to determine the depth of the object or, alternatively, use stereo vision to determine the depth of the object. If the PDAF depth value is less than the threshold value (e.g., the object is in close proximity) the depth determination system outputs the PDAF depth value as the depth of the object. Alternatively, if the PDAF depth value meets or exceeds the threshold value (e.g., the object is not in close proximity), the depth determination system uses stereo vision to determine a stereo depth value indicating the depth of the object.

In some embodiments, the depth determination system determines whether the stereo depth value properly identifies the depth of the object. For example, the depth determination system determines whether the location of the object (e.g., feature of the object) in each image appears at an expected location based on the known vantage point of the optical sensors. A determination that the object does not appear at expected locations in the images indicates that the shape of the object may cause features to be detected at different positions based on the vantage points of the optical sensors. In this type of embodiments, the depth determination system outputs the stereo depth value as the depth of the object when the location of the object in each image appears at the expected locations. Alternatively, the depth determination system outputs the PDAF depth value as the depth of the object when the location of the object in each image does not appear at the expected locations.

Figure 1:
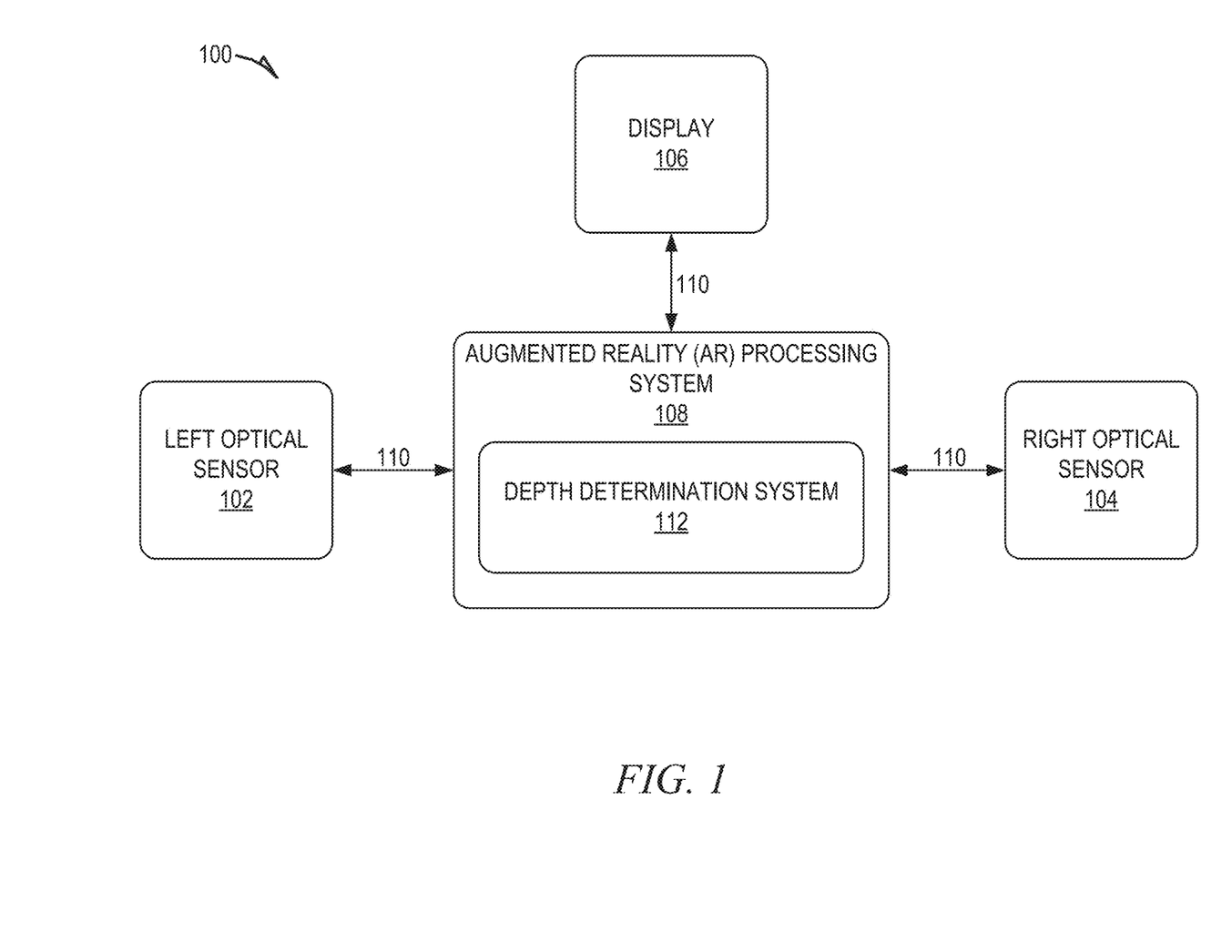
FIG. 1 shows a block diagram of a system for varied depth determination using stereo vision and PDAF, according to some example embodiments.

FIG. 1 shows a block diagram of an AR device 100 for varied depth determination using stereo vision and PDAF, according to some example embodiments. The AR device 100 provides functionality to augment the real-world environment of a user. For example, the AR device 100 allows for a user to view real-world objects in the user's physical environment along with virtual content to augment the user's environment. The virtual content may provide the user with data describing the user's surrounding physical environment, such as presenting data describing nearby businesses, providing directions, displaying weather information, and the like.

The virtual content may be presented to the user based on the distance and orientation of the physical objects in the user's real-world environment. For example, the virtual content may be presented to appear overlaid on adjacent to real world objects related to the virtual content. As an example, virtual content describing a business may be presented to appear overlaid or adjacent to the business which it describes. As another example, virtual content providing directions to a destination may be presented to appear overlaid with the path (e.g., street, ground) that the user is to follow to reach the destination.

In some embodiments, the AR device 100 may be a mobile device, such as a smartphone or tablet, that presents real-time images of the user's physical environment along with virtual content. Alternatively, the AR device 100 may be a wearable device, such as a helmet or glasses, that allows for presentation of virtual content in the line of sight of the user, thereby allowing the user to view both the virtual content and the real-world environment simultaneously. For example, the AR device 100 may include one or more transparent or semi-transparent display lenses that display virtual content virtual content generated by the AR device 100 to the user while also allowing the user to view the real-world environment through the display lenses.

As shown, the AR device 100 includes a left optical sensor 102, a right optical sensor 104, and a display 106 connected to and configured to communicate with an AR processing system 108 via communication links 110. The communication links 110 may be either physical or wireless. For example, the communication links 110 may be comprised of physical wires or cables connecting the left optical sensor 102 the right optical sensor 104, and the display 106 to the AR system 108. Alternatively, the communication links 110 may be wireless links facilitated through use of a wireless communication protocol, such as BLUETOOTH.

Each of the left optical sensor 102, the right optical sensor 104, the display 106 and the AR processing system 108 may be comprised of one or more devices capable of network communication with other devices. For example, each device can include some or all of the features, components, and peripherals of the machine 500 shown in FIG. 5.

To facilitate communication with other device, each device includes a communication interface configured to receive a communication, such as a request, data, and the like, from another device in communication with the device and pass the communication along to an appropriate module or component running on the device. The communication interface also sends communications to the other devices in communication with the device.

The left optical sensor 102 and right optical sensor 104 may be any type of sensor capable of capturing image data. For example, the left optical sensor 102 and the right optical sensor 104 may be cameras configured to capture images and/or video, infrared (IR) sensor that detects radiation, and the like. The left optical sensor 102 and/or right optical sensor 104 may also include a PDAF sensing component for capturing depth data. Alternatively, in some embodiments, the AR device 100 may include separate PDAF sensors. The data (e.g., images, depth data) captured by the left optical sensor 102 and the right optical sensor 104 are provided to the AR processing system 108 via the communication links 108.

To allow for use of stereo vison, the left optical sensor 102 and the right optical sensor 104 are displaced horizontally from one another to capture images depicting two differing views of the real-world environment from two different vantage points. The orientation of the optical sensors 102, 104 within the AR device 100 is calibrated to provide a known image transformation between the two optical sensors 102, 104. The image transformation is a function that maps the location of a pixel in one image to the corresponding location of the pixel in the corresponding image.

For the image transformation to properly map the location of pixels between the images, the optical sensors 102, 104 are positioned at a predetermined distance from each other and aligned to capture a specific vantage point. The vantage point of each optical sensor 102, 104 indicates the field of view and focal point captured by the optical sensor 102, 104. The know distance between the optical sensors 102, 104 and the know vantage point of each optical sensor 102, 104 can be used to calculate the transformation between images captured by each of the optical sensors 102, 104.

The display 106 may be any of a variety of types of displays capable of presenting virtual content. For example, the display 106 may be a monitor or screen upon which virtual content may be presented simultaneously with images of the user's physical environment. Alternatively, the display 106 may be a transparent display that that allows the user to view virtual content being presented by the display 106 in conjunction with real world objects that are present in the user's line of sight through the display 106.

The AR processing system 108 is configured to provide AR functionality to augment the real-world environment of the user. The AR processing system 108 uses images captured by the optical sensors 102, 104 to identify and determine the location (e.g., depth, direction) of physical objects in the surrounding real-world environment. The AR processing system 108 generates and causes presentation of virtual content on the display 106 based on the physical location of the surrounding real-world objects to augment the real-world environment of the user.

The AR processing system 108 uses the sensor data (e.g., images, depth data) captured by the optical sensors 102, 104 to determine the depth of the physical objects depicted in the images in relation to the AR device 100. The AR processing system 108 uses the determined depth of the objects to generate the virtual content. For example, the depth of the objects may be used to determine the proper size of the virtual content to provide for an illusion that the virtual content is properly overlain over the physical object.

As explained earlier, stereo vision does not perform well under certain circumstances, such as when objects are in close proximity to the optical sensors 102, 104 and/or the shape of the object may cause features to be detected at different positions based on the vantage points of the optical sensors 102, 104. To alleviate the shortcomings of stereo vision, the AR processing system 108 uses the functionality of a depth determination system 112 that allows for use of a combination of both stereo vision and PDAF to determine depth data. PDAF provides better performance than stereo vision under certain circumstance, such as when objects are in close proximity. The depth determination system 112 therefore may use stereo vision generally to determine depth data and switch to using PDAF to determine depth data in the situations in which PDAF provides better performance. For example, PDAF may be used when objects are in close proximity to the optical sensors 102, 104 and/or the shape of the object may cause the features to be detected at different position using stereo vision.

The depth determination system 112 determines whether to use stereo vision or PDAF based on a depth value determined using PDAF (PDAF depth value) and a threshold value. The PDAF depth value indicates the depth of an object detected by an optical sensor 102, 104. The depth determination system 112 compares the PDAF depth value to the threshold value to determine whether to use the PDAF depth value to determine the depth of the object or, alternatively, use stereo vision to determine the depth of the object. If the PDAF depth value is less than the threshold value (e.g., the object is in close proximity) the depth determination system 112 outputs the PDAF depth value as the depth of the object. Alternatively, if the PDAF depth value meets or exceeds the threshold value (e.g., the object is not in close proximity), the depth determination system 112 uses stereo vision to determine a stereo depth value indicating the depth of the object.

In some embodiments, the depth determination system 112 determines whether the stereo depth value properly identifies the depth of the object. For example, the depth determination system 112 determines whether the location of the object (e.g., feature of the object) in each image appears at an expected location based on the known vantage point of the optical sensors. A determination that the object does not appear at expected locations in the images indicates that the shape of the object may cause features to be detected at different positions based on the vantage points of the optical sensors. In this type of embodiments, the depth determination system 112 outputs the stereo depth value as the depth of the object if the location of the object in each image is determined to be at the expected locations. Alternatively, the depth determination system outputs the PDAF depth value as the depth of the object if the location of the object in each image does not appear at the expected locations.

Figure 2:
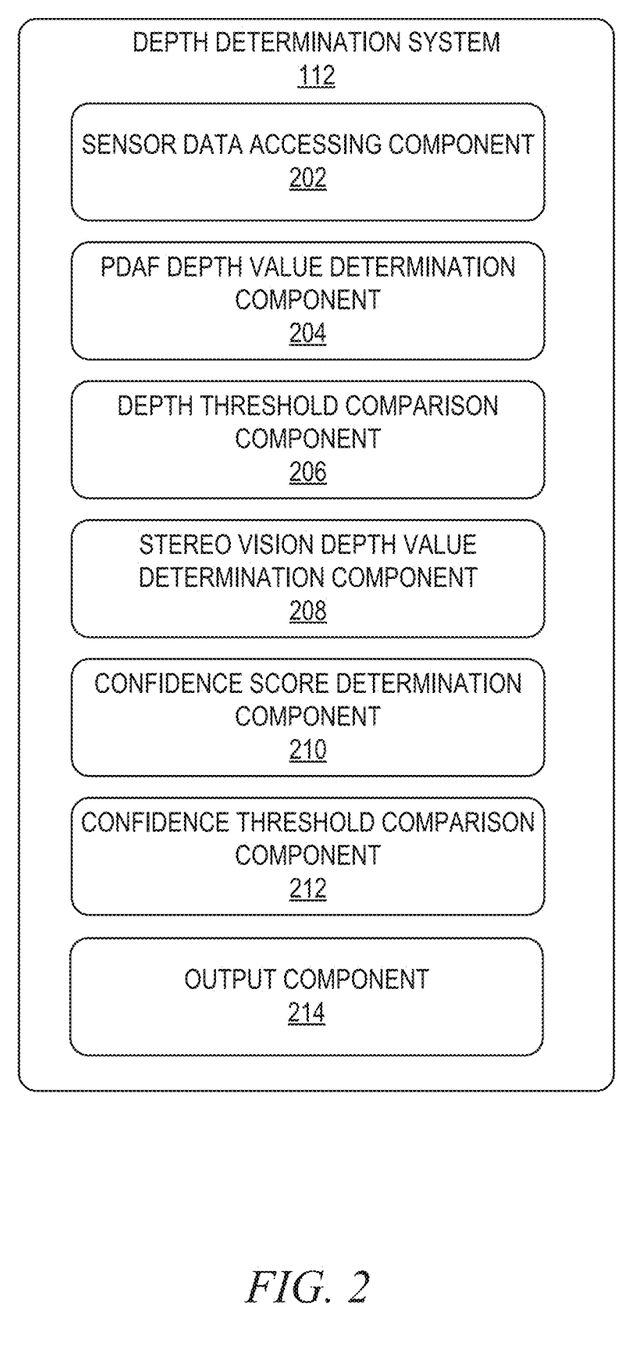
FIG. 2 is a block diagram of a varied depth determination system, according to some example embodiments.

FIG. 2 is a block diagram of a depth determination system 112, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the depth determination system 112 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the depth determination system 112 includes a sensor data accessing component 202, a PDAF depth value determination component 204, a depth threshold comparison component 206, a stereo vision depth value determination component 208, a confidence score determination component 210, a confidence threshold comparison component 212, and an output component 214.

The sensor data accessing component 202 accesses sensor data from the left optical sensor 102 and the right optical sensor 104. The sensor data may include PDAF depth data and images captured by the left optical sensor 102 and the right optical sensor 104. The PDAF depth data indicating the depth of an object detected by the optical sensors 102, 104. The optical sensors 102, 104 may include an internal PDAF sensing component that allows for determining depth data using PDAF. Alternatively, optical sensors 102, 104 may include a separate PDAF sensor used to capture PDAF data.

The images include corresponding images captured by the left optical sensor 102 and the right optical sensor 104. Corresponding images are a pair of two images that were captured by the two optical sensors 102, 104 at approximately the same time. The corresponding images captured by the optical sensors 102, 104 can be used to determine depth data using computer stereo vison. To utilize computer stereo vision, the two optical sensors 102, 104 are displaced horizontally from one another and used to capture images depicting two differing views of the real-world environment from two different vantage points. Accordingly, the corresponding images accessed by the image accessing component 202 depict the physical environment of the AR device 100 from the vantage point of the of the optical sensor 102, 104 that captured the respective image. For example, the image from the corresponding images that was captured by the left optical sensor 102 depicts the physical environment from the vantage point of the left optical sensor 102, and the image that was captured by the right optical sensor 104 depicts the physical environment from the vantage point of the left optical sensor 104.

The sensor accessing component 202 may access the sensor data (e.g., images, PDAF depth data) from the left optical sensor 102 and right optical sensor 104 directly or via the AP processing system 108. For example, the left optical sensor 102 and right optical sensor 104 may provide the sensor data to the sensor data accessing component 202 directly using the communication links 110. As another example, the left optical sensor 102 and right optical sensor 104 may provide the sensor data to the AR processing system 108 and the AR processing system 108 then provides the sensor data to the sensor data accessing component 202 or stores the sensor data in a memory from which it may be accessed by the sensor data accessing component 202. The sensor data accessing component 202 provides the accessed sensor data to the other components of the depth determination system 112.

The PDAF depth value determination component 204 determines a PDAF depth value from the depth data received from the optical sensors 102, 104. The PDAF depth value indicates the depth of an object detected by the optical sensors 102, 104 as determined using PDAF. The PDAF depth value determination component 204 may determined the PDAF depth value in multiple ways. For example, in some embodiments, the PDAF depth value determination component 204 may simply use the DPAF depth data received from one of the optical sensors 102, 104 as the PDAF depth value. As another example, the PDAF depth value determination component 204 may determine the PDAF depth value by averaging the PDAF depth data received from each optical sensor 102, 104. For example, PDAF depth value determination component 204 may determine a PDAF depth value based on the PDAF depth data received from one of optical sensor 102 and determine another PDAF depth value based on the PDAF depth data received from the other optical sensor 104. The PDAF depth value determination component 204 may then determine the PDAF depth values by averaging the two PDAF depth values determined using the PDAF depth data received from each optical sensor. In any case, the PDAF depth value determination component 204 provides the resulting PDAF depth value to the depth threshold comparison component 206.

The depth threshold comparison component 206 compares the PDAF depth value to a threshold depth value. The threshold depth value may be a predetermined value that represents a depth at which objects considered to be in close proximity of the AR device 100. As explained earlier, stereo vision does not perform well when objects are in close proximity. The depth threshold comparison component 206 compares the PDAF depth value to threshold depth value to determine whether the detected object is or is not within close proximity to the AR device 100. If the PDAF depth value is less than the threshold depth value, the object is considered to be in close proximity of the AR device 100, whereas the object is considered to not be in close proximity of the AR device 100 if the PDAF depth value meets (e.g., is greater than or equal to) the threshold depth value.

The depth threshold comparison component 206 updates the other components of the depth determination system 112 based on the outcome of the comparison. For example, the depth threshold comparison component 206 notifies the output component 214 if the PDAF depth value is determined to be less than the threshold depth value. In this situation the PDAF depth value is used as the depth of the object because the objects are determined to be in close proximity of the AR device 100. Alternatively, the depth threshold comparison component 206 notifies the stereo vision depth value determination component 208 if the PDAF depth value meets the threshold depth value.

The stereo vision depth value determination component 208 determines a stereo vision depth value using stereo vision. The stereo vision depth value indicates the depth of the object. When using stereo vision, two optical sensors 102, 104 are displaced horizontally from one another and used to capture images depicting two differing views of a real-world environment from two different vantage points. The relative depth of the objects captured in the images is determined using triangulation by comparing the relative positions of the objects in the two images. For example, the relative positions of matching objects (e.g., features) identified in the captured images are used along with the known orientation of the optical sensors (e.g., distance between the optical sensors, vantage points the optical sensors) to estimate the depth of the objects.

Accordingly, the stereo vision depth value determination component 208 uses the corresponding images captured by the optical sensors 102, 104 to determine the stereo vision depth value of the detected object. For example, the stereo vision depth value determination component 208 uses feature detection to detect the object (e.g., features of the object) in each of the images and then uses triangulation to determine the depth of the object. The triangulation is determined based on the location of matching features in each of the images and the known orientation of the optical sensors 102, 104.

In some situations, stereo vision may not perform well even when objects are not in close proximity to the AR device 100. For example, the shape of some objects may cause features to be detected at different positions by the two optical sensors 102, 104. As a specific example, the edge of a cylindrical object, such as a soda can, may be detected at two different positions by each of the optical sensors 102, 104 based on the varied vantage point of each. In this type of situation, the stereo vision depth value may be less accurate than the PDAF depth value.

To ensure that the stereo depth value provides a more accurate representation of the depth, the confidence score determination component 210 determines a confidence score indicating a level of confidence that the stereo depth value is more accurate than the PDAF depth value. The confidence score determination component 210 determines the confidence score based on the location of matching features in the two images used to determine the stereo depth value. For example, the confidence score determination component 210 uses the known location of the feature in one or both of the images to determine an expected location of the feature in the other image.

The actual location of the feature indicates the location within an image at which the feature is depicted. For example, the actual location may be represented as coordinates describing the location of the pixels in the image that depict the feature. The expected location of a feature indicates the location within an image at which the feature should be depicted based on the known location of the feature in the matching image and the known orientation (e.g., vantage points and distance between) the two optical sensors 102, 104.

The confidence score determination component 210 determines the confidence score for a pixel based on methods such as left-right agreement matching. This method determines confidence by computing the difference of a re-projected position of a pixel using the left and right disparity maps. A small distance between the original pixel and the re-projected feature indicates a high confidence and a high distance indicates a low confidence.

The confidence score determination component 210 provides the confidence score to the confidence threshold comparison component 212. The confidence threshold comparison component 212 compares the confidence score to a threshold confidence score. The threshold confidence score may be a predetermined value that indicates a point at which the PDAF depth value may provide higher accuracy than the stereo vision depth value. For example, a confidence score lower than the threshold confidence score indicates that the PDAF depth value provides higher accuracy than the stereo vision depth value, whereas a confidence score that meets (e.g., is greater than or equal to) the threshold confidence score indicates that the stereo vision depth value provides higher accuracy than the PDAF depth value.

The confidence threshold comparison component 212 provides the output component 214 with a notification based on the comparison. For example, the notification indicates whether the confidence score meets the threshold confidence score or is less than the threshold confidence score.

The output component 214 provides an output to the AR processing system 108 that indicates the depth of the object. The output component 214 may output either the PDAF depth value or the stereo depth value as the depth of the object based on the determinations of the other components of the depth determination system. For example, the output component 214 outputs the PDAF depth value if the PDAF depth value is determined to be less than the threshold depth value or the confidence score is determined to be less than the threshold confidence score. In contrast, the output component 214 outputs the stereo vision depth value if the PDAF depth value is determined to meet the threshold depth value and the confidence score is determined to be meet the threshold confidence score.

Figure 3:
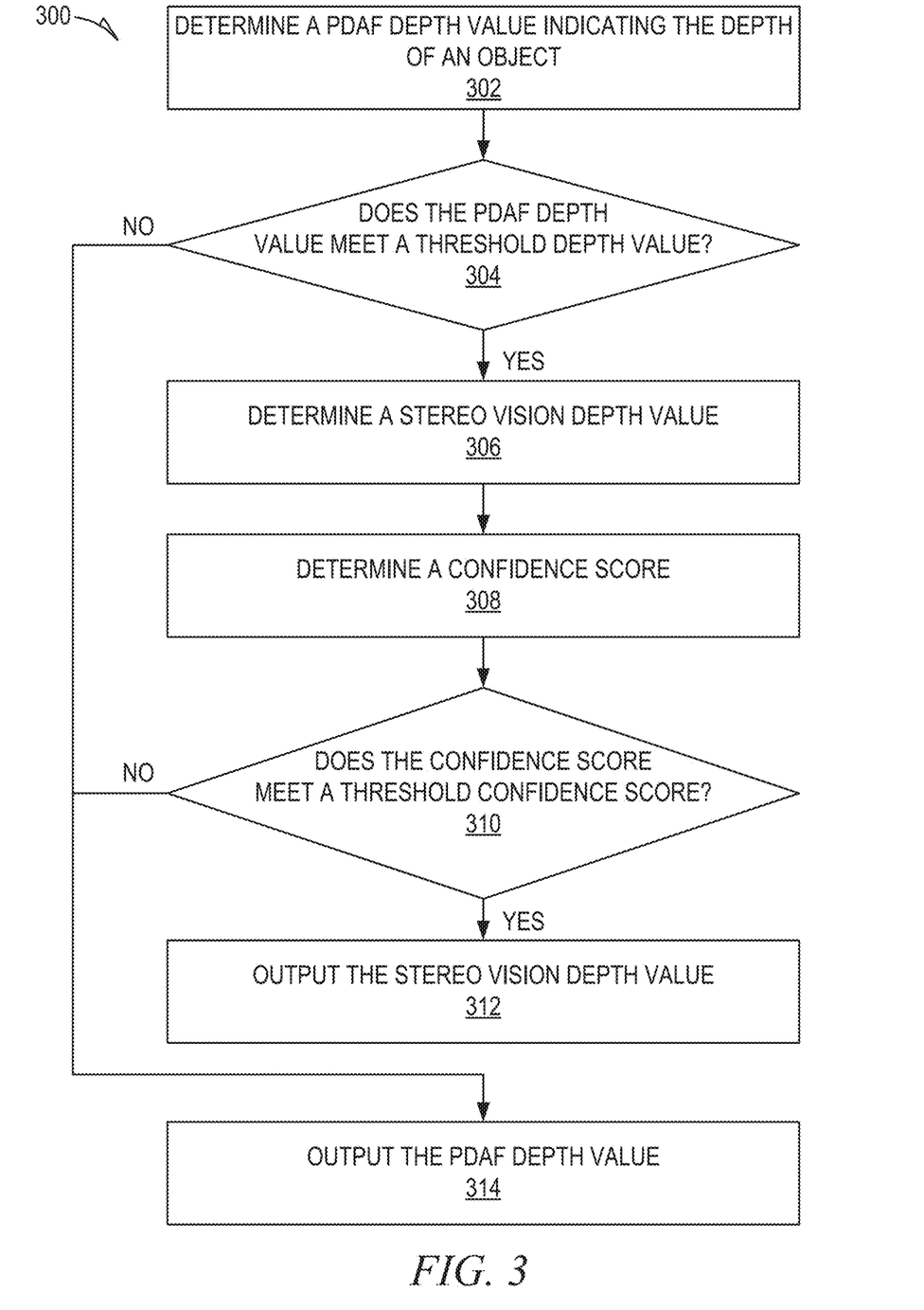
FIG. 3 is a flow diagram of a method for varied depth determination using stereo vision and PDAF, according to some example embodiments.

FIG. 3 is a flow diagram of a method 300 for varied depth determination using stereo vision and PDAF, according to some example embodiments. The method 300 may be embodied in computer readable instructions for execution by one or more computer processors such that the operations of the method 300 may be performed in part or in whole by the depth determination system 112; accordingly, the method 300 is described below by way of example with reference to the depth determination system 112. However, it shall be appreciated that at least some of the operations of the method 300 may be deployed on various other hardware and/or software configurations and the method 300 is not intended to be limited to the depth determination system 112.

At operation 302, the PDAF depth value determination component 204 determines a PDAF depth value indicating the depth of an object. The PDAF depth value determination component 204 determines a PDAF depth value from the depth data received from the optical sensors 102, 104. The PDAF depth value indicates the depth of an object detected by the optical sensors 102, 104 as determined using PDAF. The PDAF depth value determination component 204 may determine the PDAF depth value in multiple ways. For example, in some embodiments, the PDAF depth value determination component 204 may simply use the DPAF depth data received from one of the optical sensors 102, 104 as the PDAF depth value. As another example, the PDAF depth value determination component 204 may determine the PDAF depth value by averaging the PDAF depth data received from each optical sensor 102, 104. In any case, the PDAF depth value determination component 204 provides the resulting PDAF depth value to the depth threshold comparison component 206.

At operation 304, the depth threshold comparison component 206 determines whether the PDAF depth value meets a threshold depth value. The threshold depth value may be a predetermined value that represents a depth at which objects are considered to be in close proximity of the AR device 100. As explained earlier, stereo vision does not perform well when objects are in close proximity. The depth threshold comparison component 206 compares the PDAF depth value to the threshold depth value to determine whether the detected object is or is not within close proximity to the AR device 100. If the PDAF depth value is less than the threshold depth value, the object is considered to be in close proximity of the AR device 100, whereas the object is considered to not be in close proximity of the AR device 100 if the PDAF depth value meets (e.g., is greater than or equal to) the threshold depth value.

If the depth determination system 112 determines that the PDAF depth value is less than the threshold depth value, at operation 314, the output component 214 outputs the PDAF depth value. For example, the output component 214 provides the PDAF depth value to the AR processing system 108 as indicating the depth of the object.

Alternatively, if the depth determination system 112 determines that the PDAF depth value meets (e.g., is greater than or equal to) the threshold depth value, at operation 306, the stereo vision depth value determination component 208 determines a stereo vision depth value. The stereo vision depth value determination component 208 determines a stereo vision depth value using stereo vision. The stereo vision depth value indicates the depth of the object. When using stereo vision, two optical sensors 102, 104 that are displaced horizontally from one another are used to capture images depicting two differing views of a real-world environment from two different vantage points. The relative depth of the objects captured in the images is determined using triangulation by comparing the relative positions of the objects in the two images. For example, the relative positions of matching objects (e.g., features) identified in the captured images are used along with the known orientation of the optical sensors (e.g., distance between the optical sensors, vantage points the optical sensors) to estimate the depth of the objects.

Accordingly, the stereo vision depth value determination component 208 uses the corresponding images captured by the optical sensors 102, 104 to determine the stereo vision depth value of the detected object. For example, the stereo vision depth value determination component 208 uses feature detection to detect the object (e.g., features of the object) in each of the images and then uses triangulation to determine the depth of the object. The triangulation is determined based on the location of matching features in each of the images and the known orientation of the optical sensors 102, 104.

At operation 308, the confidence score determination component 210 determines a confidence score. The confidence score indicates a level of confidence that the stereo depth value is more accurate than the PDAF depth value. The confidence score determination component 210 determines the confidence score for a pixel based on methods such as left-right agreement matching. This method determines confidence by computing the difference of a re-projected position of a pixel using the left and right disparity maps. A small distance between the original pixel and the re-projected feature indicates a high confidence and a high distance indicates a low confidence.

The actual location of the feature indicates the location within an image at which the feature is depicted. For example, the actual location may be represented as coordinates describing the location of the pixels in the image that depict the feature. The expected location of a feature indicates the location within an image at which the feature should be depicted based on the known location of the feature in the matching image and the known orientation (e.g., vantage points and distance between) the two optical sensors 102, 104.

The confidence score determination component 210 determines the confidence score for a pixel based on methods such as left-right agreement matching. This method determines confidence by computing the difference of a re-projected position of a pixel using the left and right disparity maps. A small distance between the original pixel and the re-projected feature indicates a high confidence and a high distance indicates a low confidence.

At operation 310, the confidence threshold comparison component 212 determines whether the confidence score meets a threshold confidence score. The threshold confidence score may be a predetermined value that indicates a point at which the PDAF depth value may provide higher accuracy than the stereo vision depth value. For example, a confidence score lower than the threshold confidence score indicates that the PDAF depth value provides higher accuracy than the stereo vision depth value, whereas a confidence score that meets (e.g., is greater than or equal to) the threshold confidence score indicates that the stereo vision depth value provides higher accuracy than the PDAF depth value.

If the confidence score is determined to be less than the threshold confidence score, at operation 314, the output component 214 outputs the PDAF depth value. For example, the output component 214 provides the PDAF depth value to the AR processing system 108 as indicating the depth of the object. Alternatively, if the confidence score is determined to meet the threshold confidence score, at operation 312, the output component 214 outputs the stereo vision depth value. For example, the output component 214 provides the stereo vision depth value to the AR processing system 108 as indicating the depth of the object.

Software Architecture

Figure 4:
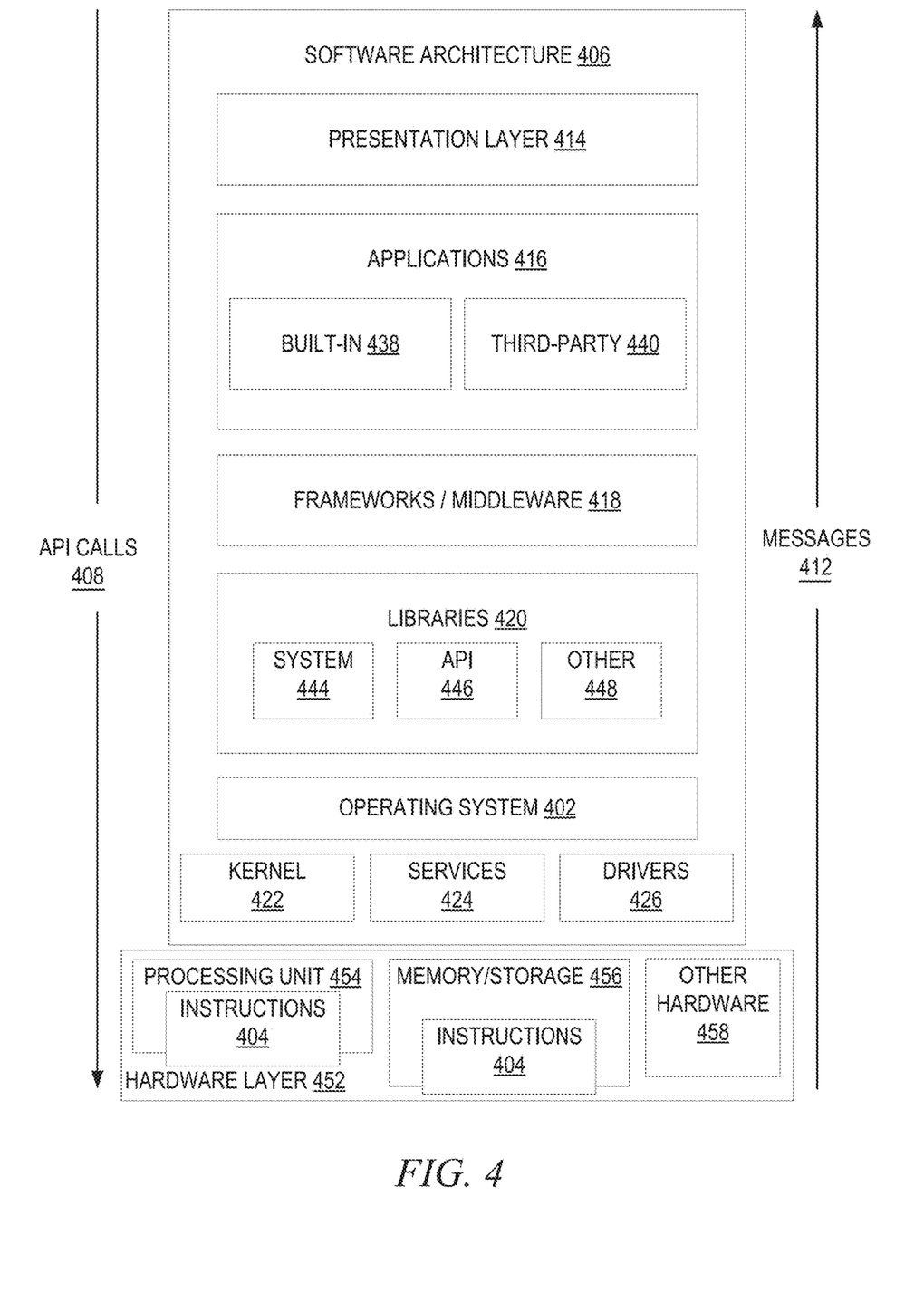
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating an example software architecture 406, which may be used in conjunction with various hardware architectures herein described. FIG. 4 is a non-limiting example of a software architecture 406 and it will be appreciated that many other architectures may be implemented to facilitate the functionality described herein. The software architecture 406 may execute on hardware such as machine 500 of FIG. 5 that includes, among other things, processors 504, memory 514, and (input/output) I/O components 518. A representative hardware layer 452 is illustrated and can represent, for example, the machine 500 of FIG. 5. The representative hardware layer 452 includes a processing unit 454 having associated executable instructions 404. Executable instructions 404 represent the executable instructions of the software architecture 406, including implementation of the methods, components, and so forth described herein. The hardware layer 452 also includes memory and/or storage modules 456, which also have executable instructions 404. The hardware layer 452 may also comprise other hardware 458.

In the example architecture of FIG. 4, the software architecture 406 may be conceptualized as a stack of layers where each layer provides particular functionality. For example, the software architecture 406 may include layers such as an operating system 402, libraries 420, frameworks/middleware 418, applications 416, and a presentation layer 414. Operationally, the applications 416 and/or other components within the layers may invoke application programming interface (API) calls 408 through the software stack and receive a response such as messages 412 in response to the API calls 408. The layers illustrated are representative in nature and not all software architectures have all layers. For example, some mobile or special purpose operating systems may not provide a frameworks/middleware 418, while others may provide such a layer. Other software architectures may include additional or different layers.

The operating system 402 may manage hardware resources and provide common services. The operating system 402 may include, for example, a kernel 422, services 424, and drivers 426. The kernel 422 may act as an abstraction layer between the hardware and the other software layers. For example, the kernel 422 may be responsible for memory management, processor management (e.g., scheduling), component management, networking, security settings, and so on. The services 424 may provide other common services for the other software layers. The drivers 426 are responsible for controlling or interfacing with the underlying hardware. For instance, the drivers 426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 420 provide a common infrastructure that is used by the applications 416 and/or other components and/or layers. The libraries 420 provide functionality that allows other software components to perform tasks in an easier fashion than to interface directly with the underlying operating system 402 functionality (e.g., kernel 422, services 424, and/or drivers 426). The libraries 420 may include system libraries 444 (e.g., C standard library) that may provide functions such as memory allocation functions, string manipulation functions, mathematical functions, and the like. In addition, the libraries 420 may include API libraries 446 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 420 may also include a wide variety of other libraries 448 to provide many other APIs to the applications 416 and other software components/modules.

The frameworks/middleware 418 (also sometimes referred to as middleware) provide a higher-level common infrastructure that may be used by the applications 416 and/or other software components/modules. For example, the frameworks/middleware 418 may provide various graphical user interface (GUI) functions, high-level resource management, high-level location services, and so forth. The frameworks/middleware 418 may provide a broad spectrum of other APIs that may be used by the applications 416 and/or other software components/modules, some of which may be specific to a particular operating system 402 or platform.

The applications 416 include built-in applications 438 and/or third-party applications 440. Examples of representative built-in applications 438 may include, but are not limited to, a contacts application, a browser application, a book reader application, a location application, a media application, a messaging application, and/or a game application. Third-party applications 440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 440 may invoke the API calls 408 provided by the mobile operating system (such as operating system 402) to facilitate functionality described herein.

The applications 416 may use built in operating system functions (e.g., kernel 422, services 424, and/or drivers 426), libraries 420, and frameworks/middleware 418 to create UIs to interact with users of the system. Alternatively, or additionally, in some systems, interactions with a user may occur through a presentation layer, such as presentation layer 414. In these systems, the application/component "logic" can be separated from the aspects of the application/component that interact with a user.

Figure 5:
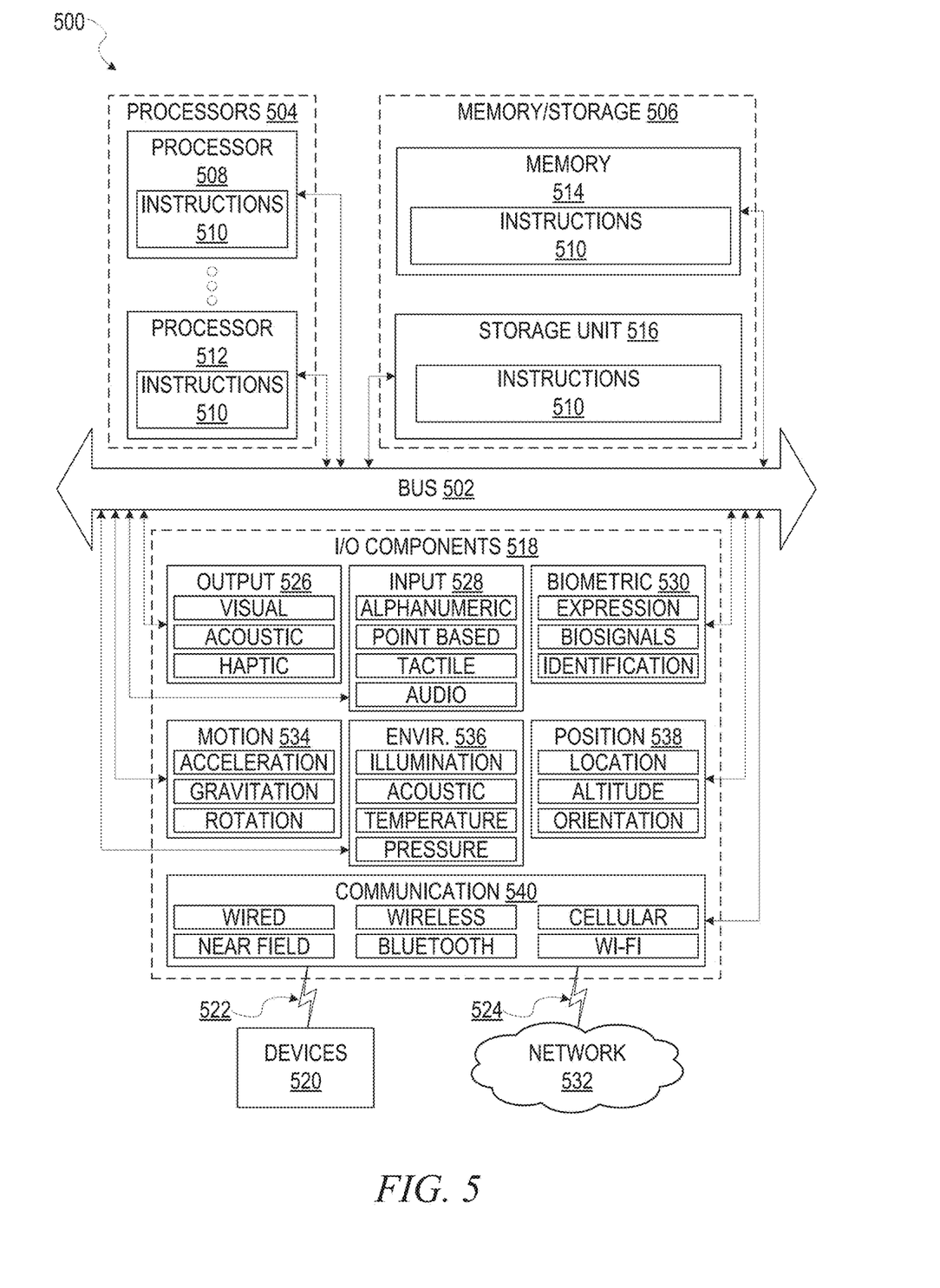
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions 404 from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed. As such, the instructions 510 may be used to implement modules or components described herein. The instructions 510 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 500 capable of executing the instructions 510, sequentially or otherwise, that specify actions to be taken by machine 500. Further, while only a single machine 500 is illustrated, the term "machine" shall also be taken to include a collection of machines that individually or jointly execute the instructions 510 to perform any one or more of the methodologies discussed herein.

The machine 500 may include processors 504, memory/storage 506, and I/O components 518, which may be configured to communicate with each other such as via a bus 502. The memory/storage 506 may include a memory 514, such as a main memory, or other memory storage, and a storage unit 516, both accessible to the processors 504 such as via the bus 502. The storage unit 516 and memory 514 store the instructions 510 embodying any one or more of the methodologies or functions described herein. The instructions 510 may also reside, completely or partially, within the memory 514, within the storage unit 516, within at least one of the processors 504 (e.g., within the processor's cache memory), or any suitable combination thereof, during execution thereof by the machine 500. Accordingly, the memory 514, the storage unit 516, and the memory of processors 504 are examples of machine-readable media.

The I/O components 518 may include a wide variety of components to receive input, provide output, produce output, transmit information, exchange information, capture measurements, and so on. The specific I/O components 518 that are included in a particular machine 500 will depend on the type of machine. For example, portable machines such as mobile phones will likely include a touch input device or other such input mechanisms, while a headless server machine will likely not include such a touch input device. It will be appreciated that the I/O components 518 may include many other components that are not shown in FIG. 5. The I/O components 518 are grouped according to functionality merely for simplifying the following discussion and the grouping is in no way limiting. In various example embodiments, the I/O components 518 may include output components 526 and input components 528. The output components 526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 518 may include biometric components 530, motion components 534, environmental components 536, or position components 538 among a wide array of other components. For example, the biometric components 530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 534 may include acceleration sensor components (e.g., accelerometer), gravitation sensor components, rotation sensor components (e.g., gyroscope), and so forth. The environmental components 536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518 may include communication components 540 operable to couple the machine 500 to a network 532 or devices 520 via coupling 524 and coupling 522, respectively. For example, the communication components 540 may include a network interface component or other suitable device to interface with the network 532. In further examples, communication components 540 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 520 may be another machine or any of a wide variety of peripheral devices (e.g., a peripheral device coupled via a USB).

Moreover, the communication components 540 may detect identifiers or include components operable to detect identifiers. For example, the communication components 540 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 510 for execution by the machine 500, and includes digital or analog communications signals or other intangible medium to facilitate communication of such instructions 510. Instructions 510 may be transmitted or received over the network 532 using a transmission medium via a network interface device and using any one of a number of well-known transfer protocols.

"CLIENT DEVICE" in this context refers to any machine 500 that interfaces to a communications network 532 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 532.

"COMMUNICATIONS NETWORK" in this context refers to one or more portions of a network 532 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 532 or a portion of a network 532 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 510 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 510. The term "machine-readable medium" shall also be taken to include any medium, or combination of multiple media, that is capable of storing instructions 510 (e.g., code) for execution by a machine 500, such that the instructions 510, when executed by one or more computer processors 504 of the machine 500, cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 504) may be configured by software (e.g., an application 416 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 504 or other programmable processor 504. Once configured by such software, hardware components become specific machines 500 (or specific components of a machine 500) uniquely tailored to perform the configured functions and are no longer general-purpose processors 504. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 504 configured by software to become a special-purpose processor, the general-purpose processor 504 may be configured as respectively different special-purpose processors (e.g., comprising different hardware components) at different times. Software accordingly configures a particular processor or processors 504, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 502) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more computer processors 504 that are temporarily configured (e.g., by software) or permanently configured to perform the relevant operations. Whether temporarily or permanently configured, such processors 504 may constitute processor-implemented components that operate to perform one or more operations or functions described herein. As used herein, "processor-implemented component" refers to a hardware component implemented using one or more computer processors 504. Similarly, the methods described herein may be at least partially processor-implemented, with a particular processor or processors 504 being an example of hardware. For example, at least some of the operations of a method may be performed by one or more computer processors 504 or processor-implemented components. Moreover, the one or more computer processors 504 may also operate to support performance of the relevant operations in a "cloud computing" environment or as a "software as a service" (SaaS). For example, at least some of the operations may be performed by a group of computers (as examples of machines 500 including processors 504), with these operations being accessible via a network 532 (e.g., the Internet) and via one or more appropriate interfaces (e.g., an API). The performance of certain of the operations may be distributed among the processors 504, not only residing within a single machine 500, but deployed across a number of machines 500. In some example embodiments, the processors 504 or processor-implemented components may be located in a single geographic location (e.g., within a home environment, an office environment, or a server farm). In other example embodiments, the processors 504 or processor-implemented components may be distributed across a number of geographic locations.

"PROCESSOR" in this context refers to any circuit or virtual circuit (a physical circuit emulated by logic executing on an actual processor 504) that manipulates data values according to control signals (e.g., "commands," "op codes," "machine code," etc.) and which produces corresponding output signals that are applied to operate a machine 500. A processor 504 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 504 may further be a multi-core processor having two or more independent processors 504 (sometimes referred to as "cores") that may execute instructions 510 contemporaneously.

What is claimed is:
1. A method comprising:
accessing a pair of corresponding images that depict an object captured by a pair of optical sensors that include a first optical sensor and a second optical sensor;
determining based on the pair of optical sensors a first Phase Detection Autofocus (PDAF) value of the object based on a first image from among the pair of corresponding images captured by the first optical sensor, and a second PDAF value of the object based on a second image from among the pair of corresponding images, captured by the second optical sensor;
generating an average PDAF value based on an aggregation the first PDAF value, derived based on the first image captured by the first optical sensor and the second PDAF value, derived based on the second image captured by the second optical sensor;

performing a comparison of the average PDAF value with a threshold value; and providing an output value based on the comparison.

2. The method of claim 1, wherein the performing the comparison of the average PDAF value with the threshold value further comprises:
   determining that the average PDAF value is below the threshold value; and
   providing an output value based on the average PDAF value based on the determining that the average PDAF value is below the threshold value.

3. The method of claim 1, wherein the performing the comparison of the average PDAF value with the threshold value further comprises:
   determining that the average PDAF value exceeds the threshold value based on the comparison;
   determining a stereo vision depth value of the object in response to the determining that the average PDAF value exceeds the threshold value; and
   providing the output value based on the stereo vision depth value.

4. The method of claim 1, wherein the first optical sensor and the second optical sensor are displaced horizontally and at a known distance from one another at known vantage points.

5. The method of claim 1, wherein the providing the output based on the comparison includes:
   causing display of a presentation of the average PDAF value.

6. The method of claim 1, determining the first Phase Detection Autofocus (PDAF) value of the object, and the second PDAF value of the object includes:
   determining an expected location of the object within the first image and the second image;
   detecting the object at the expected location within the first image and the second image; and
   determining the first Phase Detection Autofocus (PDAF) value of the object, and the second PDAF value of the object responsive to the detecting the object at the expected location.

7. The method of claim 1, wherein the threshold value comprises a predefined value that indicates a maximum distance.

8. A system comprising:
   one or more computer processors; and
   one or more computer-readable mediums storing instructions that, when executed by the one or more computer processors, cause the system to perform operations comprising:
      accessing a pair of corresponding images that depict an object captured by a pair of optical sensors that include a first optical sensor and a second optical sensor;
      determining based on the pair of optical sensors a first Phase Detection Autofocus (PDAF) value of the object based on a first image from among the pair of corresponding images captured by the first optical sensor, and a second PDAF value of the object based on a second image from among the pair of corresponding images, captured by the second optical sensor;
      generating an average PDAF value based on an aggregation the first PDAF value, derived based on the first image captured by the first optical sensor and the second PDAF value, derived based on the second image captured by the second optical sensor;
      performing a comparison of the average PDAF value with a threshold value; and
      providing an output value based on the comparison.

9. The system of claim 8, wherein the performing the comparison of the average PDAF value with the threshold value further comprises:
   determining that the average PDAF value is below the threshold value; and
   providing an output value based on the average PDAF value based on the determining that the average PDAF value is below the threshold value.

10. The system of claim 8, wherein the performing the comparison of the average PDAF value with the threshold value further comprises:
    determining that the average PDAF value exceeds the threshold value based on the comparison;
    determining a stereo vision depth value of the object in response to the determining that the average PDAF value exceeds the threshold value; and
    providing the output value based on the stereo vision depth value.

11. The system of claim 8, wherein the first optical sensor and the second optical sensor are displaced horizontally and at a known distance from one another at known vantage points.

12. The system of claim 8, wherein the providing the output based on the comparison includes:
    causing display of a presentation of the average PDAF value.

13. The system of claim 8, determining the first Phase Detection Autofocus (PDAF) value of the object, and the second PDAF value of the object includes:
    determining an expected location of the object within the first image and the second image;
    detecting the object at the expected location within the first image and the second image; and
    determining the first Phase Detection Autofocus (PDAF) value of the object, and the second PDAF value of the object responsive to the detecting the object at the expected location.

14. The system of claim 8, wherein the threshold value comprises a predefined value that indicates a maximum distance.

15. A non-transitory machine-readable storage medium comprising instructions that, when executed by one or more processors of a machine, cause the machine to perform operations comprising:
    accessing a pair of corresponding images that depict an object captured by a pair of optical sensors that include a first optical sensor and a second optical sensor;
    determining based on the pair of optical sensors a first Phase Detection Autofocus (PDAF) value of the object based on a first image from among the pair of corresponding images captured by the first optical sensor, and a second PDAF value of the object based on a second image from among the pair of corresponding images, captured by the second optical sensor;
    generating an average PDAF value based on an aggregation the first PDAF value, derived based on the first image captured by the first optical sensor and the second PDAF value, derived based on the second image captured by the second optical sensor;
    performing a comparison of the average PDAF value with a threshold value; and
    providing an output value based on the comparison.

16. The non-transitory machine-readable storage medium of claim 15, wherein the performing the comparison of the average PDAF value with the threshold value further comprises:

determining that the average PDAF value is below the threshold value; and providing an output value based on the average PDAF value based on the determining that the average PDAF value is below the threshold value.

17. The non-transitory machine-readable storage medium of claim 15, wherein the performing the comparison of the average PDAF value with the threshold value further comprises:

determining that the average PDAF value exceeds the threshold value based on the comparison;

determining a stereo vision depth value of the object in response to the determining that the average PDAF value exceeds the threshold value; and providing the output value based on the stereo vision depth value.

18. The non-transitory machine-readable storage medium of claim 15, wherein the first optical sensor and the second optical sensor are displaced horizontally and at a known distance from one another at known vantage points.

19. The non-transitory machine-readable storage medium of claim 15, wherein the providing the output based on the comparison includes:

causing display of a presentation of the average PDAF value.

20. The non-transitory machine-readable storage medium of claim 15, determining the first Phase Detection Autofocus (PDAF) value of the object, and the second PDAF value of the object includes:

determining an expected location of the object within the first image and the second image;

detecting the object at the expected location within the first image and the second image; and determining the first Phase Detection Autofocus (PDAF) value of the object, and the second PDAF value of the object responsive to the detecting the object at the expected location.

* * * * *